(12) United States Patent
Yamada

(10) Patent No.: US 6,523,084 B2
(45) Date of Patent: Feb. 18, 2003

(54) DATA PROCESSING APPARATUS

(75) Inventor: Kazumi Yamada, Kyotanabe (JP)

(73) Assignee: Matsushita Electric Industrial Co., Ltd. (JP)

( * ) Notice: Subject to any disclaimer, the term of this patent is extended or adjusted under 35 U.S.C. 154(b) by 71 days.

(21) Appl. No.: 09/847,435

(22) Filed: May 3, 2001

(65) Prior Publication Data

US 2001/0042160 A1 Nov. 15, 2001

(30) Foreign Application Priority Data

May 12, 2000 (JP) ........................................ 2000-139257

(51) Int. Cl.[7] .............................................. G06F 12/16
(52) U.S. Cl. ....................... 711/104; 711/103; 712/233; 712/239; 712/240; 365/185.33; 365/189.01; 365/230.01
(58) Field of Search ................................. 711/103, 104; 710/35; 365/185.08, 185.33, 230.08, 189.01, 230.01; 712/233, 239, 240

(56) References Cited

U.S. PATENT DOCUMENTS

| | | | | |
|---|---|---|---|---|
| 5,590,073 A | * | 12/1996 | Arakawa et al. | 365/185.08 |
| 5,706,239 A | * | 1/1998 | Brys | 365/185.33 |
| 5,936,971 A | | 8/1999 | Harari et al. | 371/10.2 |
| 6,006,288 A | * | 12/1999 | McIntyre et al. | 710/34 |
| 6,026,027 A | | 2/2000 | Terrell, II et al. | 365/185.33 |
| 6,141,700 A | | 10/2000 | Iwata | 710/3 |
| 6,230,261 B1 | * | 5/2001 | Henry et al. | 712/240 |
| 6,246,634 B1 | * | 6/2001 | Nojima | 365/185.08 |

* cited by examiner

*Primary Examiner*—Do Hyun Yoo
*Assistant Examiner*—Ngoc V Dinh
(74) *Attorney, Agent, or Firm*—Parkhurst & Wendel, L.L.P.

(57) ABSTRACT

To provide a data processing apparatus that allows the occurrence of a gate disturb effect to be reduced and the reliability of data processing using the internal flash memory to be improved. A loop process section of a program stored in flash memory is held in a storage area in SRAM that corresponds to a range from an address specified by the SRAM start address storage to a value specified by a SRAM size storage, thereby the section is read only from the SRAM when the loop process is performed the subsequent times. Thus, if the program is looped, the flash memory is not accessed and therefore the frequency of normal reads from the flash memory decreases to minimize the occurrence of the gate disturb effect, allowing the flash memory to hold data that is stable for an extended period of time.

1 Claim, 2 Drawing Sheets

(a) Flash WRITE (b) NORMAL READ (HV1≫HV2)

(c) Flash DELETE (HV1≫HV2)

DATA PROCESSING APPARATUS

FIELD OF THE INVENTION

The present invention relates to a data processing apparatus that is a semiconductor device such as a microcomputer and contains flash memory used in data processing.

BACKGROUND OF THE INVENTION

In the field of information processing by a computer system attached internally or externally to an office automation or industrial device, data processing is performed, for example, on data read and written between the device and the computer system, according to the intended use of the data, and data processing apparatuses for that data processing are widely used.

Today, such a data processing apparatus is used in the form of a semiconductor device such as a microcomputer or micro-controller and typically contains internal flash memory used for storing data during data processing.

The flash memory contained in such a conventional data processing apparatus will be described below.

FIG. 2 is a schematic diagram showing a structure of a NOR flash memory cell contained in a data processing apparatus. During a write into the flash memory cell, high potential HV1 is applied to the gate ("G" in FIG. 2) of the memory cell, high potential HV0 (HV0≠HV1) is applied to the drain ("D" in FIG. 2), and the source ("S" in FIG. 2) is grounded so that some of electrons traveling from the drain to the source move to the floating gate ("FG" in FIG. 2) to write data in the cell, as shown in FIG. 2A.

During a delete operation, the gate of the memory cell is grounded, high potential HV2 is applied to the source, (where HV2 is sufficiently lower than high potential HV1 for the write operation, that is, HV1>HV2), and the drain is opened to discharge the electrons from the floating gate to delete the data, as shown in FIG. 2C.

During a normal read operation, high potential HV2 is applied to the gate of the memory cell (where HV2 is sufficiently lower than high potential HV1 for the write operation, that is, HV2>HV2), the source is grounded, and it is determined whether the potential of the drain is a High (H) level or Low (L) level to read data according to the level, as shown in FIG. 2B.

The data processing apparatus having the conventional NOR flash memory configuration as describe above has the following problem: when the drain is at a high potential because of precharging or other reasons during normal read operation in the flash memory configuration, a phenomenon commonly called a "gate disturb" occurs in which, because the potential of the gate is at a high level even though it is sufficiently lower than the potential for the write operation, the cell becomes the same state as that for a write operation and electrons move into the floating gate little by little to change stored information, lowering the reliability of the data processing.

DISCLOSURE OF THE INVENTION

The present invention solves the above-described problem with the prior art and it is an object of the present invention to provide a data processing apparatus that allows the occurrence of a gate disturb effect to be reduced to improve the reliability of data processing using internal flash memory.

The data processing apparatus of the present invention is a data processing apparatus containing internal flash memory used for data processing by a CPU, the data processing apparatus comprising: a controller for controlling the operation of components during the data processing by the CPU; SRAM contained within the apparatus together with the flash memory; a selector for selecting an address information source for the SRAM; chip select R/W generation means for generating a chip select signal to the flash memory, a chip select signal and an R/W signal to the SRAM, and a control signal controlling the selection of the address information source by the selector, based on an execution address and the R/W signal indicating a read or write provided from the CPU and a signal indicating the start of a read or write provided from the controller; SRAM start address storage means for storing the start address of an available area in the SRAM; SRAM size storage means for storing the size of the available area in the SRAM; branch detection means for monitoring an execution address from the CPU to detect a branch process in the data processing and outputting a positive- or negative-direction branch signal depending on the branch direction of the branch process; SRAM address storage means for holding the address of the available area in the SRAM with the timing of the negative-direction branch signal from the branch detection means; END execution address storage means for holding an execution address from the CPU with the timing of the negative-direction branch signal from the branch detection means; START execution address storage means for holding an execution address from the CPU with the timing of a start execution address store instruction signal output from the controller; and SRAM address generation means for generating the address of the available area in the SRAM based on signals from the SRAM start address storage means, the SRAM address storage means, and the controller, wherein the chip select R/W generation means outputs the chip select signal to the flash memory, the chip select signal and R/W signal to the SRAM, and the control signal controlling the selection of the address information source by the selector so that a loop process section of a program stored in the flash memory resulting from a branch in the program is held in a storage area in the SRAM corresponding to a range from an address specified by the SRAM start address storage means to a value specified by the SRAM size storage means, based on the read start signal or write start signal output from the controller with the timing of the positive- or negative-direction branch signal from the branch detection means.

According to the above-described configuration, a loop process section of a program stored in the flash memory is held in a storage area in the SRAM that corresponds to a range from an address specified by the SRAM start address storage means to a value specified by the SRAM size storage means, thereby the section is read only from the SRAM when the loop process is performed the subsequent times. Thus, the flash memory is not accessed when the program is looped, and therefore the frequency of normal reads from the flash memory decreases to minimize the occurrence of the gate disturb effect, allowing the flash memory to hold data that is stable for an extended period of time.

As described above, a loop process section of a program stored in the flash memory is held in a storage area in the SRAM that corresponds to a range from an address specified by the SRAM start address storage means to a value specified by the SRAM size storage means, thereby the section is read only from the SRAM when the loop process is performed the subsequent times. Thus, the flash memory is not accessed when the program is looped, and therefore the frequency of normal reads from the flash memory decreases to minimize the occurrence of the gate disturb effect, allowing the flash memory to hold data that is stable for an extended period of time.

Thus, the occurrence of a gate disturb effect can be reduced and the reliability of data processing using the internal flash memory can be improved.

DESCRIPTION OF THE EMBODIMENT

An embodiment of the present invention will be described with respect to the accompanying drawings. The data processing apparatus is a data processing apparatus containing internal flash memory.

Figure 1:
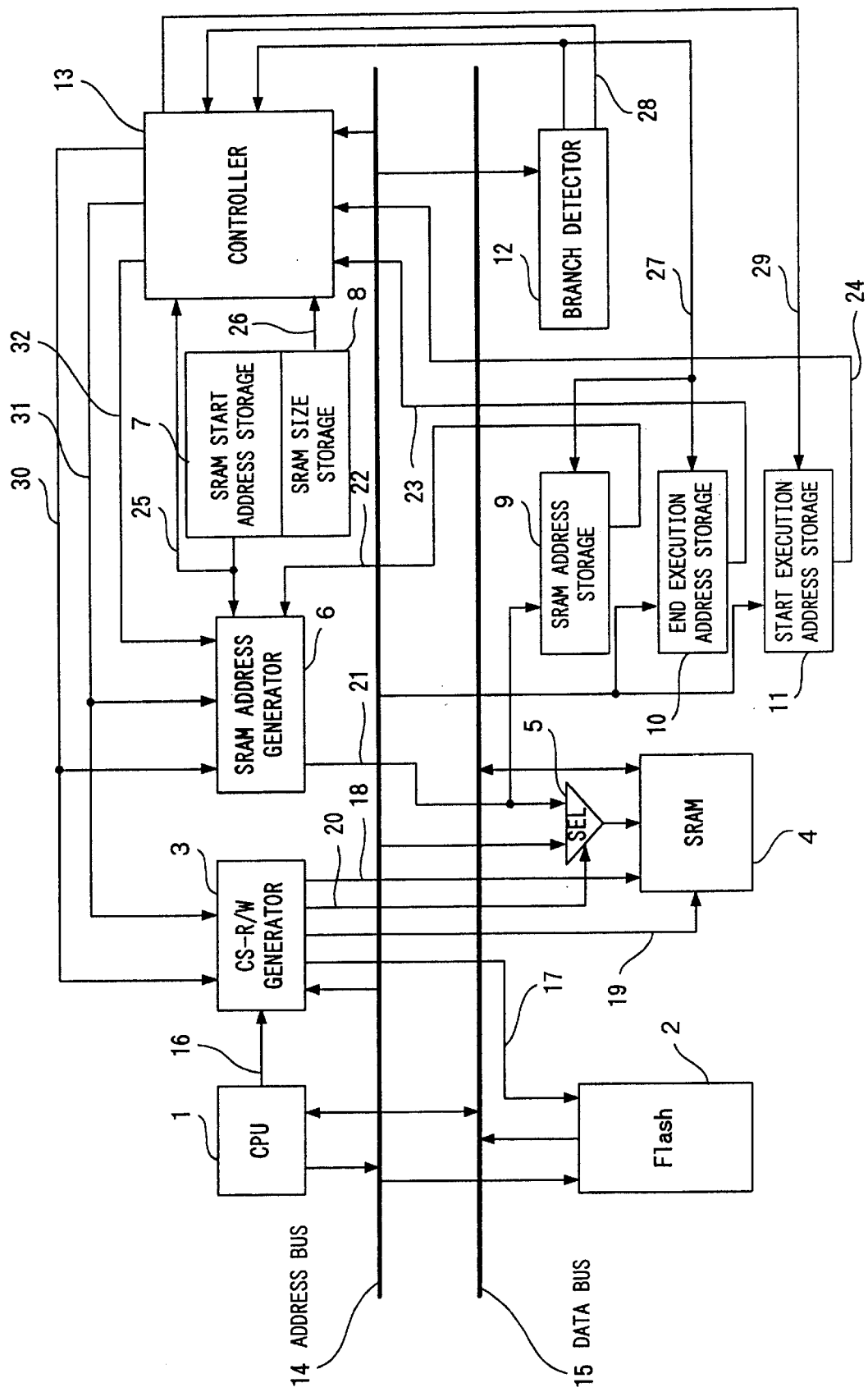
FIG. 1 is a block diagram of a configuration of a data processing apparatus according to one embodiment of the present invention.

FIG. 1 shows a block diagram of a configuration of the data processing apparatus according to the present embodiment. In FIG. 1, reference numeral 1 indicates a central processing unit (CPU), reference numeral 2 indicates flash memory 2, reference numeral 3 indicates a chip select R/W (CS-R/W) generator for providing a flash-chip select signal (Flash-CS signal) 17 to the flash memory 2, providing a SRAM-R/W signal 19 to SRAM 4, and controlling a selector (SEL) 5 by a selector control signal 20, reference numeral 4 indicates the SRAM, reference numeral 5 indicates the selector for selecting an address information source for accessing the SRAM 4, reference numeral 6 indicates a SRAM address generator which is an address information source for generating an address for accessing the SRAM 4, reference numeral 7 indicates a SRAM start address storage for storing the start address of an available area in the SRAM 4, reference numeral 8 indicates a SRAM size storage for storing the size (capacity) of the available area in the SRAM 4, reference numeral 9 indicates a SRAM address storage for storing an address generated by the SRAM address generator 6, reference numeral 10 indicates an END execution address storage for storing an execution address for the CPU 1 by a negative-direction branch signal 27 output from a branch detector 12, reference numeral 11 indicates a START execution address storage for storing an execution address for the CPU 1 by a start execution address store instruction signal 29 output from a controller 13, reference numeral 12 indicates a branch detector for detecting an address for a branch process, and reference numeral 13 indicates a controller for controlling the chip select R/W generator 3, SRAM address generator 6, and START execution address storage 11.

Reference number 14 indicates an address bus, reference numeral 15 indicates a data bus, reference numeral 16 indicates a CPU_RW signal indicating a read/write from the CPU 1, reference numeral 17 indicates a chip select (Flash_CS) signal to the flash memory 2, reference numeral 18 indicates a chip select (SRAM_CS) signal to the SRAM 4, reference numeral 19 indicates an SRAM_RW signal indicating a read/write to the SRAM 4, reference numeral 20 indicates a selector control signal for controlling the selector 5, reference numeral 21 indicates an address signal for accessing the SRAM, reference numeral 22 indicates an address signal output from the SRAM address storage 9, reference numeral 23 indicates an address signal output from the END execution address storage 10, reference numeral 24 indicates an address signal output from the START execution address storage 11, reference numeral 25 indicates an address signal output from the SRAM start address storage 7, reference numeral 26 indicates a size signal output from the SRAM size storage 8, reference numeral 27 indicates a negative-direction branch signal output from the branch detector 12, reference numeral 28 indicates a positive-direction branch signal output from the branch detector 12, reference numeral 29 indicates a START execution address store instruction signal output form the controller 13, reference numeral 30 indicates a read start signal output from the controller 13, reference numeral 31 indicates a write start signal output from the controller 13, and reference numeral 32 indicates an offset address signal output from the controller 13.

The operation of the data processing apparatus with internal flash memory, which is configured as described above, will be described below.

If an execution address on the address bus 14 is not between an address signal 24 from the START execution address storage 11 and an address signal 23 from the END execution address storage 10 when the CPU 1 accesses the flash memory 2, the controller 13 generates a write start signal 31 to cause the START execution address storage 11 to store the execution address currently on the address bus 14.

The controller 13 subsequently monitors an execution address on the address bus 14 to determine whether or not it is within a range from the START execution address signal 24 to a size value stored in the SRAM size storage 8 until the branch detector 12 detects a branch process from the flow of addresses on the address bus 14 to generate a negative-direction branch signal 27. If the execution address is within the range, the controller 13 outputs the offset value without applying any process to it. If the execution address is beyond the range because of a branch instruction (if a positive-direction branch signal 28 is generated), the controller 13 generates a write start signal 31 to cause the START execution address storage 11 to store the execution address currently on the address bus 14, or, if it is beyond the range not because of a branch instruction, the controller 13 outputs an offset value obtained by subtracting an value output from the SRAM size storage 8 from the address.

If the branch detector 12 generates a negative-direction branch signal 27, the controller 13 determines whether the execution address on the address bus 14 is between an address signal 24 from the START execution address storage 11 and an address signal 23 from the END execution address storage 10. If the address falls within the range, the controller 13 generates a read start signal 30. The controller 13 subsequently monitors an execution address on the address bus 14 to determine whether it is between a value in the START execution address storage 11 and an value in the END execution address storage 10 until it generates a write start signal 31 the next time. If it is within the range, the controller 13 outputs an offset value from the value in the END execution address storage 10.

If a negative-direction branch occurs in a branch process, the SRAM address storage 9 stores the current SRAM address signal 21 from the SRAM address generator 6 and the END execution address storage 10 stores an execution address currently on the address bus 14.

When a write start signal 31 is generated, an address signal 25 from the SRAM start address storage 7 is input into the SRAM address generator 6, which outputs it as an SRAM address signal 21 to the selector 5. The SRAM address generator 6 subsequently adds the value of an offset address signal 32 to an address signal 25 from the SRAM start address storage 7 to output it as an SRAM address signal 21 to the selector 5. When a read start signal 30 is generated, the SRAM address generator 6 causes an address signal 22 from the SRAM address storage 9 to be input into it and outputs it as an SRAM address signal 21 to the selector 5. The SRAM address generator 6 subsequently subtracts the value of an offset address signal 32 from an output value from the SRAM address storage 9 to output the result to the selector 5.

If the chip select R/W generator 3 determines that the execution address on the address bus 14 is in an address area for the SRAM4, it causes the selector 5 to select the execution address on the address bus 14 by using a selector control signal 20, generates an SRAM_CS signal 18 to the SRAM 4, and outputs a CPU-RW signal 16 as the SRAM_RW signal 19 without applying any process to it.

On the other hand, if the chip select R/W generator 3 determines that the execution address on the address bus 14 is in an address area for the flash memory 2, it causes the selector 5 to select an SRAM address 21 by using the selector control signal 20, then, generates a Flash_CS signal 17 and SRAM_CS signal 18 to bring the SRAM_RW signal 19 into the write state if a write start signal 31 has been generated lately by the controller 13, or negates the Flash_CS signal 17 and generates only the SRAM_CS signal 18 to bring the SRAM_RW signal 19 to the read state if a read start signal 30 has been generated lately by the controller 13.

Figure 2:
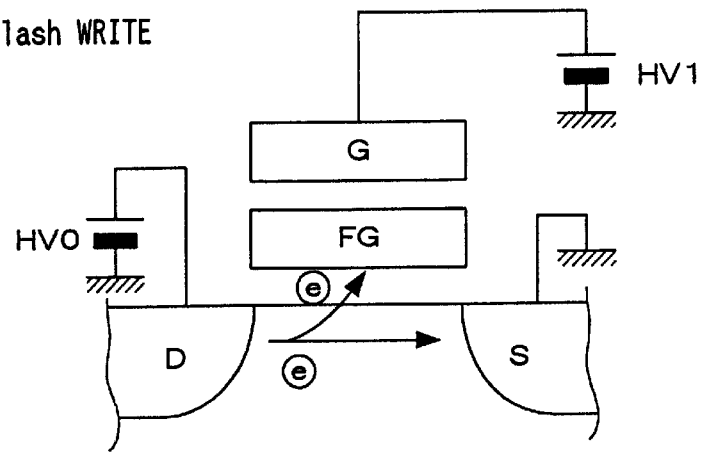
FIGS. 2A–2C is a schematic diagram of a structure of an internal flash memory in a data processing apparatus according to a prior art.
Figure 2:
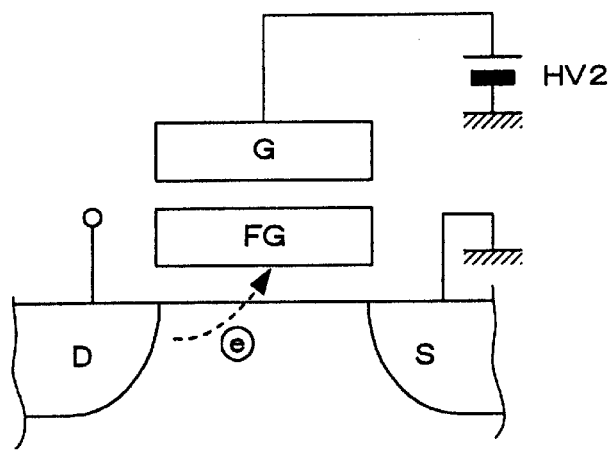
Figure 2:
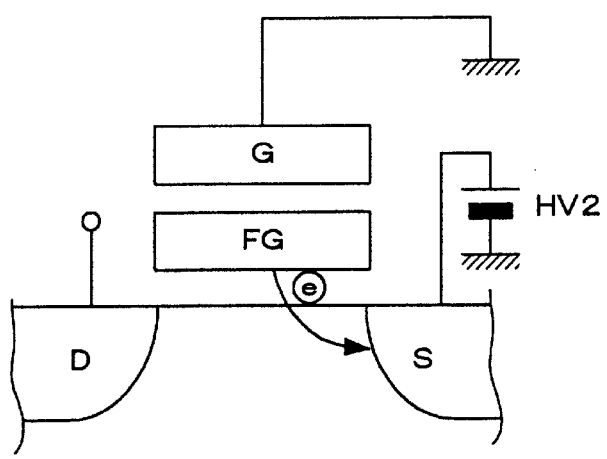

According to this embodiment, a loop process section of a program stored in the flash memory 2 is held in a storage area in the SRAM 4 that corresponds to a range from an address specified by the SRAM start address storage 7 to a value specified by the SRAM size storage 8 as described above, thereby the section is read only from the SRAM 4 when the loop process is performed the subsequent times. Thus, if the program is looped, the flash memory 2 is not accessed and therefore the frequency of normal reads from the flash memory 2 as shown in FIG. 2B decreases to minimize the occurrence of the gate disturb effect, allowing the flash memory 2 to hold data that is stable for an extended period of time.

As a result, the occurrence of a gate disturb effect can be reduced and the reliability of data processing using the internal flash memory can be improved.

What is claimed is:

1. A data processing apparatus containing internal flash memory used for data processing by a CPU, said data processing apparatus comprising:

a controller for controlling the operation of components during the data processing by said CPU;

SRAM contained within said apparatus together with said flash memory;

a selector for selecting an address information source for said SRAM;

chip select R/W generation means for generating a chip select signal to said flash memory, a chip select signal and an R/W signal to said SRAM, and a control signal controlling the selection of said address information source by said selector, based on an execution address and the R/W signal indicating a read or write provided from said CPU and a signal indicating the start of a read or write provided from said controller;

SRAM start address storage means for storing the start address of an available area in said SRAM;

SRAM size storage means for storing the size of the available area in said SRAM;

branch detection means for monitoring an execution address from said CPU to detect a branch process in said data processing and outputting a positive- or negative-direction branch signal depending on the branch direction of the branch process;

SRAM address storage means for holding the address of the available area in said SRAM with the timing of the negative-direction branch signal from said branch detection means;

END execution address storage means for holding an execution address from said CPU with the timing of the negative-direction branch signal from said branch detection means;

START execution address storage means for holding an execution address from said CPU with the timing of the start execution address store instruction signal output from said controller; and SRAM address generation means for generating the address of the available area in said SRAM based on signals from said SRAM start address storage means, said SRAM address storage means, and said controller, wherein said chip select R/W generation means outputs the chip select signal to said flash memory, the chip select signal and R/W signal to said SRAM, and the control signal controlling the selection of said address information source by said selector so that a loop process section of a program stored in the flash memory resulting from a branch in the program is held in a storage area in the SRAM corresponding to a range from an address specified by said SRAM start address storage means to a value specified by said SRAM size storage means, based on the read start signal or write start signal output from said controller with the timing of the positive- or negative-direction branch signal from said branch detection means.

* * * * *